US011912428B2

(12) United States Patent
Jomain et al.

(10) Patent No.: US 11,912,428 B2
(45) Date of Patent: Feb. 27, 2024

(54) FUEL STORAGE SYSTEMS

(71) Applicant: AIRBUS OPERATIONS LIMITED, Bristol (GB)

(72) Inventors: Pierre Jomain, Bristol (GB); Ian Plastow, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 7 days.

(21) Appl. No.: 17/390,530

(22) Filed: Jul. 30, 2021

(65) Prior Publication Data
US 2022/0081123 A1 Mar. 17, 2022

(30) Foreign Application Priority Data

Sep. 14, 2020 (GB) ..................................... 2014409

(51) Int. Cl.
| B64D 37/32 | (2006.01) |
| A62C 3/06 | (2006.01) |
| B64D 13/06 | (2006.01) |
| B64D 37/10 | (2006.01) |
| B64D 37/34 | (2006.01) |
| B64D 45/00 | (2006.01) |

(52) U.S. Cl.
CPC ................ B64D 37/32 (2013.01); A62C 3/06 (2013.01); B64D 37/10 (2013.01); B64D 37/34 (2013.01); *B64D 2013/0659* (2013.01); *B64D 2045/009* (2013.01)

(58) Field of Classification Search
CPC .. B64D 37/32; B64D 37/02; B64D 2045/009; B64D 37/10; B64D 2013/0659; A62C 3/08; B60K 2015/03296; B60K 15/03519
See application file for complete search history.

(56) References Cited

U.S. PATENT DOCUMENTS

| 9,758,255 | B1 | 9/2017 | Kirk et al. | |
| 2010/0108811 | A1* | 5/2010 | Gupta | B64D 37/32 62/7 |
| 2013/0000142 | A1* | 1/2013 | Tichborne | B64D 37/34 34/104 |
| 2015/0217153 | A1* | 8/2015 | Jones | B64D 37/02 169/62 |
| 2017/0283083 | A1* | 10/2017 | Behbahani-Pour | A62C 3/08 |

FOREIGN PATENT DOCUMENTS

CN 1 1051 0133 11/2019

OTHER PUBLICATIONS

Combined Search and Examination Report for GB2014409.3 dated Feb. 19, 2021, 3 pages.
Communication pursuant to Article 94(3) EPC, for Application No. EP 21187594.3, six pages, dated Jul. 17, 2023.

* cited by examiner

*Primary Examiner* — Atif H Chaudry
(74) *Attorney, Agent, or Firm* — Nixon & Vanderhye P.C.

(57) ABSTRACT

A fuel storage system is disclosed having a fuel tank configured to store a liquid fuel; a controllable pressure source for altering the pressure in an ullage space of the fuel tank; and a controller. The controller is configured to determine a target pressure for the ullage space at a given time based on information relating to a temperature of fuel inside the fuel tank at the given time; and to control the pressure source such as to cause the pressure in the ullage space to be substantially equal to the target pressure.

22 Claims, 5 Drawing Sheets

FUEL STORAGE SYSTEMS

CROSS RELATED APPLICATION

This application claims priority to United Kingdom (GB) Patent Application 2014409.3 filed Sep. 14, 2020, the entire content of which is hereby incorporated by reference.

TECHNICAL FIELD

The present invention relates to a fuel storage system, an aircraft comprising a fuel storage system, and a method of controlling the flammability of a fuel tank containing fuel.

BACKGROUND

When a flammable material is stored in a confined space, such as fuel in a fuel tank, it is often desirable to take measures to prevent the flammable material from igniting. This is particularly true for fuel tanks installed in vehicles.

Commercial aircraft must comply with safety rules, which require the flammability levels of fuel tank vapours to be reduced. Such flammability reduction can be achieved in various ways, including filling the ullage space of the fuel tank with inert gas, and increasing the pressure within the fuel tank. Both of these mechanisms are currently used by in-service commercial aircraft.

SUMMARY

A first aspect of the present invention provides a fuel storage system. The fuel storage system comprises a fuel tank configured to store a liquid fuel; a controllable pressure source for altering the pressure in an ullage space of the fuel tank; and a controller. The controller is configured to determine a target pressure for the ullage space at a given time based on information relating to a temperature of fuel inside the fuel tank at the given time; and to control the pressure source such as to cause the pressure in the ullage space to be substantially equal to the target pressure.

Optionally, the fuel storage system further comprises a controllable pressure release valve, and the controller is configured to control the pressure source and/or the pressure release valve such as to cause the pressure in the ullage space to be substantially equal to the target pressure.

Optionally, the target pressure is a pressure at which the flammability of the fuel tank is less than or equal to a predefined flammability threshold, wherein the predefined flammability threshold depends on the temperature of the fuel in the fuel tank, the pressure in the ullage space, and the chemical properties of the fuel in the fuel tank.

Optionally, the controllable pressure source comprises a source of air which is at a pressure greater than the pressure in the ullage space for at least some time periods during normal operation of the fuel storage system.

Optionally, the controllable pressure source comprises a compressor.

Optionally, the controllable pressure source comprises a controllable valve disposed between the ullage space and a high-pressure environment in which the pressure is higher than the pressure in the ullage space for at least some time periods during normal operation of the fuel storage system, wherein the controllable valve is selectively openable to connect the ullage space to the high-pressure environment. Optionally, the high-pressure environment is a pressurised region of an aircraft.

Optionally, the information relating to a temperature of fuel inside the fuel tank at the given time comprises a current measured value of a parameter indicative of the temperature of fuel inside the fuel tank.

Optionally, the parameter indicative of the temperature of the fuel inside the tank is the temperature of the fuel inside the tank, and the fuel storage system further comprises a temperature sensor configured to measure the temperature of fuel inside the fuel tank in communication with the controller.

Optionally, the parameter indicative of the temperature of fuel inside the fuel tank is the temperature of fuel inside a different fuel tank, and the controller is configured to calculate a value for the temperature of fuel inside the fuel tank at the given time based on a current value of the temperature inside the different fuel tank using a predefined relationship between temperature of fuel in the different fuel tank and temperature of fuel in the fuel tank.

Optionally, the parameter indicative of the current temperature of fuel inside the fuel tank is the temperature of the external environment of the fuel tank, and the controller is configured to calculate a value for the temperature of fuel inside the fuel tank at the given time based on a current value of the temperature of the external environment of the fuel tank using a predefined relationship between temperature of the external environment and temperature of fuel in the fuel tank.

Optionally, the information relating to a temperature of fuel inside the fuel tank at the given time comprises a historical value of a parameter indicative of the temperature of fuel inside the fuel tank, and the controller is configured to generate a predicted value for the temperature of the fuel inside the fuel tank at the given time based on the historical value using predefined fuel temperature evolution information.

Optionally, the controller is pre-programmed with a minimum allowable pressure for the fuel tank, and is configured to control the pressure source such that the pressure in the ullage space is maintained greater than or equal to the minimum allowable pressure during normal operation of the fuel storage system. Optionally, the controller is pre-programmed with a maximum allowable pressure for the fuel tank, and is configured to control the pressure source such that the pressure in the ullage space is maintained less than or equal to the maximum allowable pressure during normal operation of the fuel storage system.

Optionally, the fuel storage system further comprises a controllable temperature regulation mechanism for altering the temperature of fuel stored in the fuel tank, and the controller is additionally configured to determine a target fuel temperature at the given time based on information relating to the pressure of the external environment of the fuel tank at the given time; and to control the temperature regulation mechanism such as to cause the temperature of fuel inside the tank to be substantially equal to the target fuel temperature.

Optionally, the controller is configured to maintain the pressure in the ullage space less than or equal to the pressure of the external environment of the fuel tank during normal operation of the fuel storage system, and is configured to determine the target pressure additionally based on the pressure of the external environment at the given time.

Optionally, the controller is configured to determine whether the flammability of the fuel tank will be greater than the predefined flammability threshold at the given time if the pressure in the ullage space is equal to the pressure of the external environment at the given time, or is less than the pressure of the external environment at the given time by a predefined amount; and if it is determined that the flammability of the fuel tank will be greater than the predefined flammability threshold, to determine a value for the target fuel temperature such that the flammability of the tank will be below the predefined flammability threshold when the fuel is at the target fuel temperature and the pressure in the ullage space is equal to the pressure of the external environment at the given time, or is less than the pressure of the external environment at the given time by the predefined amount.

Optionally, the temperature regulation mechanism is configured to alter the temperature of the external environment of the fuel tank.

Optionally, the temperature regulation mechanism comprises a heat exchanger disposed on or in the fuel tank.

Optionally, the temperature regulation mechanism comprises a mechanism for transferring fuel into the fuel tank fuel, wherein the transferred fuel is at a different temperature to the fuel in the fuel tank.

Optionally, the fuel tank is an additional cargo tank for an aircraft.

A second aspect of the invention provides an aircraft comprising a fuel storage system according to the first aspect.

Optionally, the fuel tank is located in a pressurised zone of the aircraft.

A third aspect of the invention provides a method of controlling the flammability of a fuel tank containing fuel. The method comprises:
- receiving a current fuel temperature value for the fuel in the fuel tank;
- determining a minimum ullage pressure using predefined flammability information for the fuel tank, wherein the determined minimum ullage pressure is the lowest ullage pressure at which the fuel tank is not flammable when fuel contained in the fuel tank is at the current fuel temperature; and
- controlling the ullage pressure to be greater than or equal to the minimum ullage pressure.

Optionally, the method further comprises:
- receiving a current external pressure value for the pressure of the external environment of the fuel tank;
- comparing the determined minimum ullage pressure to the received current external pressure value;
- if the determined minimum ullage pressure is greater than the received current external pressure value, determining a maximum fuel temperature using the predefined flammability information, wherein the maximum fuel temperature is the highest fuel temperature at which the fuel tank is not flammable when the ullage pressure is equal to the received current external pressure value;
- controlling the temperature of the fuel in the fuel tank to be less than or equal to the maximum fuel temperature; and
- controlling the ullage pressure to be greater than or equal to the minimum ullage pressure and less than or equal to the received current external pressure value.

BRIEF DESCRIPTION OF THE DRAWINGS

Embodiments of the invention will now be described, by way of example only, with reference to the accompanying drawings, in which.

DETAILED DESCRIPTION

Figure 1:
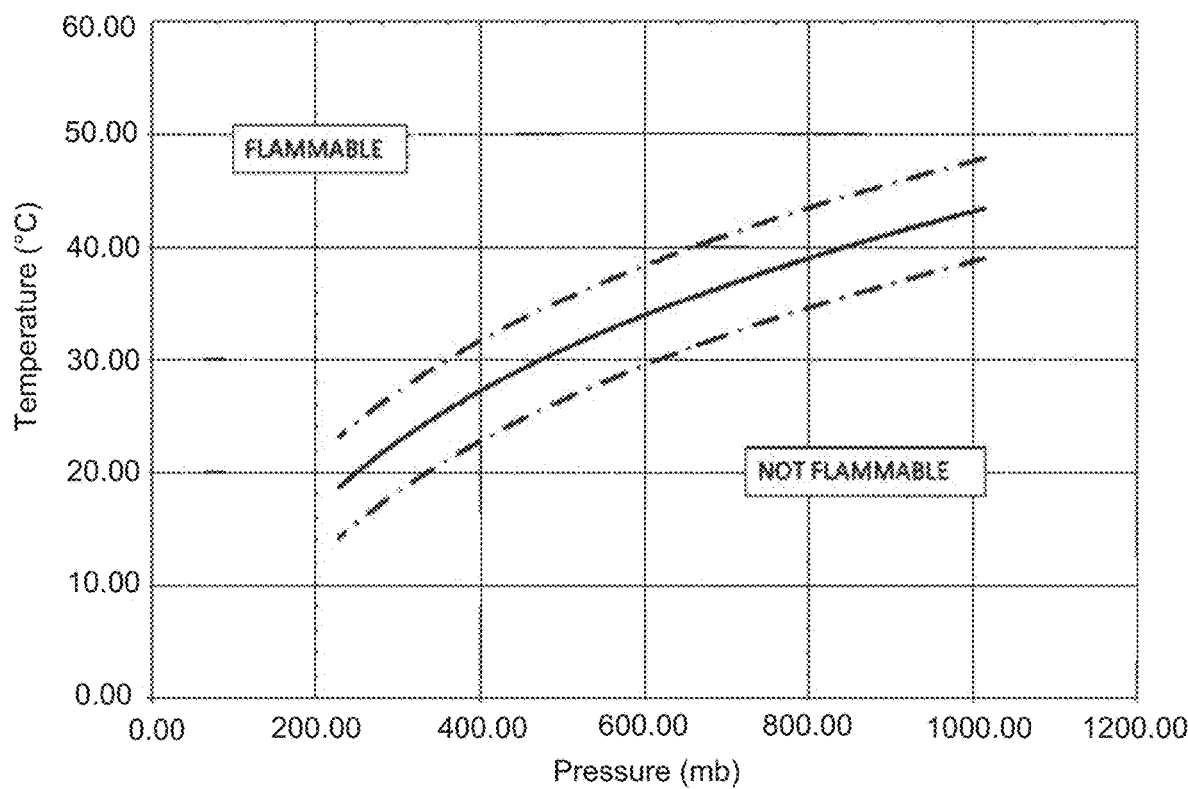
FIG. 1 is a chart which plots the lower flammability limit (LFL) of an example fuel tank containing an example liquid fuel.

Flammability of liquid fuel inside a fuel tank depends on the chemical properties of the fuel (which remain constant), but also varies with fuel temperature and the pressure in the ullage space of the fuel tank. FIG. 1 is a plot illustrating the flammability of an example fuel tank containing liquid fuel which has a mean flash point of 49° C. The flash point of a material is the lowest temperature at which its vapour will ignite in the presence of an ignition source. The solid line A represents the lower flammability limit (LFL) of the example fuel, which is defined by Federal Aviation Authority (FAA) regulations and is generally a few degrees below the flash point. This plot shows how the flammability of the tank varies with ullage space pressure and fuel temperature. It can be seen that flammability increases with fuel temperature and decreases with ullage space pressure. A similar plot can be drawn for various different fuel types, each having differing chemical properties. For pressure-temperature combinations above the line A the fuel tank is flammable, whereas for pressure-temperature combinations below the line A the fuel tank is not flammable.

The upper dashed line B on FIG. 1 represents the LFL plus one standard deviation, and the lower dashed line C represents the LFL minus one standard deviation. Different batches of the same type of fuel typically vary slightly in their chemical properties, meaning that the exact location of the LFL line A will vary according to a normal distribution. For the particular example fuel represented by FIG. 2, 85% of fuel batches will have an LFL line A between the lower line C the upper line B.

FIG. 1 illustrates how increasing the pressure within the ullage space of a fuel tank reduces the flammability of that fuel tank. Existing pressure-based flammability reduction systems for aircraft fuel tanks (that is, systems which reduce flammability to an acceptable level by maintaining a sufficiently high pressure in the ullage space of the fuel tank) regulate the pressure according to a predetermined fixed pressure profile, which must necessarily be conservative in order to ensure sufficient flammability reduction in all possible operational scenarios. This means that during a given flight of the aircraft, the fuel tanks are pressurised irrespective of whether the fuel contained therein is actually flammable, and for a significant portion of the flight the fuel tanks are likely to be maintained at a higher pressure than is actually necessary.

On commercial airliners, pressure-based flammability reduction systems are generally only used for fuel tanks located in pressurised regions of an aircraft, such as the cabin or cargo bay. One reason for this is because it is difficult to modify the structure of a tank formed by the aircraft structure (such as a wing tank) to enable it to withstand the level of internal pressure required by known pressure-based flammability reduction systems. However, for a fuel tank located in a pressurised region of an aircraft there are disadvantages associated with the pressure inside the fuel tank exceeding the pressure of the surrounding environment. In particular, this situation increases the risk of fuel or fuel vapour leaking out of the fuel tank. Example fuel storage systems according to the invention address this issue.

The examples of the invention described below each relate to a fuel storage system comprising a fuel tank configured to store a liquid fuel; a controllable pressure source for altering the pressure in an ullage space of the fuel tank; and a controller. In each example the controller is configured to determine a target pressure for the ullage space at a given time based on information relating to a temperature of fuel inside the fuel tank at the given time; and to control the pressure source such as to cause the pressure in the ullage space to be substantially equal to the target pressure. The target pressure may be a pressure (in the ullage space) at which the flammability of the fuel tank is less than or equal to the predefined flammability threshold, as will be explained further below. Fuel storage systems configured to store non-liquid fuel are out of the scope of this invention. As such, whenever "tank pressure" or "pressure within the tank" are referred to, it is the air pressure in the ullage space that is meant.

The example fuel storage systems according to the invention are able to regulate the pressure within the fuel tank in real-time (or near real-time), based on the current temperature of the fuel (that is, the temperature of the fuel at any given time during operation of the fuel storage system at which the system is performing a regulating process). On an aircraft, the temperature of stored fuel tends to vary over a flight cycle, meaning that the amount of pressure required inside a fuel tank to ensure low flammability also varies. By taking fuel temperature into account, the example fuel storage systems according to the invention are advantageously able to ensure that the pressure in the fuel tank is always high enough to achieve a sufficiently low flammability, whilst simultaneously ensuring that it is not excessively high and that any periods in which the pressure inside the fuel tank is above the pressure of the surrounding environment are as short as possible. The risk of fuel or fuel vapour leaking out of the tank is consequently minimized.

A further benefit is that the maximum pressure inside a fuel tank of a fuel storage system according to the invention is expected to be significantly less, for most aircraft applications, than is the case with current pressure-based flammability reduction systems. This opens up the potential to utilise pressure-based flammability reduction for a wider range of aircraft fuel tanks, including fuel tanks not located in a pressurised region of the aircraft.

Figure 2:
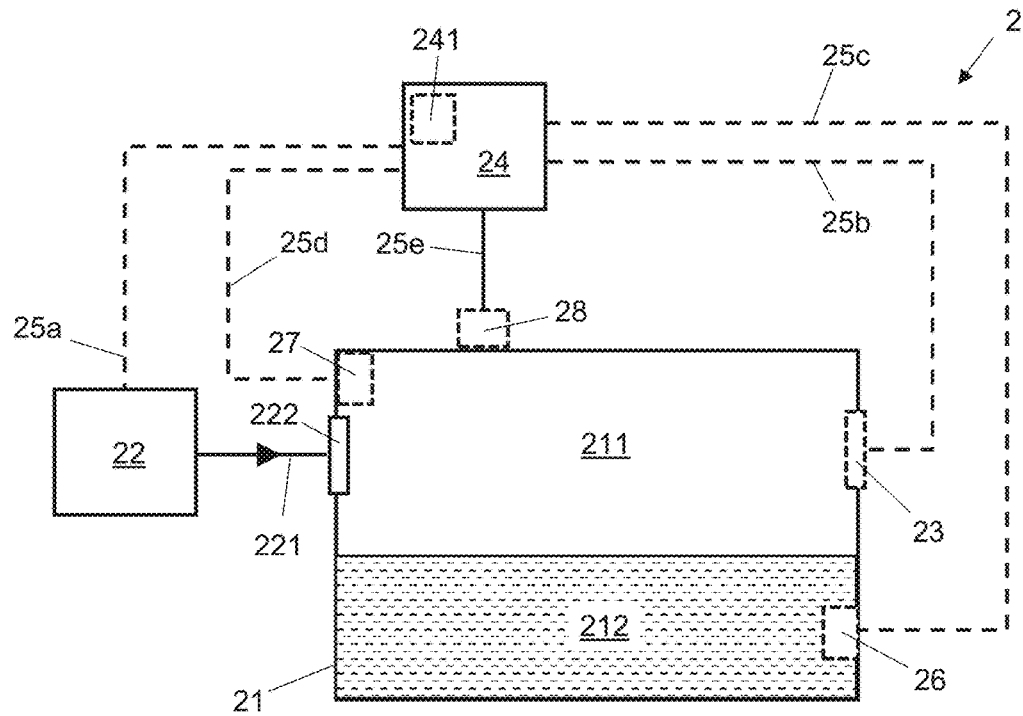
FIG. 2 is a schematic representation of an example fuel storage system according to the invention.

FIG. 2 shows a generalised example fuel storage system 2 according to the invention. The fuel storage system 2 comprises a fuel tank 21, a controllable pressure source 22, a controllable pressure release valve 23, and a controller 24. The controllable pressure release valve 23 is an optional component, and so is indicated using dashed lines.

The fuel tank 21 is configured to store a liquid fuel, and is shown partially filled with liquid fuel 212. The ullage space 211 of the fuel tank 21 is filled with air at a known pressure. In other examples the ullage space 211 could be filled with an inert gas. The fuel tank 21 may be an aircraft fuel tank. In some examples the fuel tank 21 is configured to be located in a pressurised environment, such as the cabin or cargo hold of an aircraft. In some examples the fuel tank 21 is an additional cargo tank (ACT). Other examples are possible in which the fuel tank 21 is not located in pressurised environment. In such examples the fuel tank 21 may be located in a wing, in an empennage, an unpressurised region of a fuselage, or in any other non-pressurised region of an aircraft.

The pressure source 22 is configured to alter the pressure in the ullage space of the fuel tank. The pressure source is configured to deliver air into the ullage space 211 via an inlet 222. The inlet 222 may be located at or near the top of the fuel tank 21, so that it will be in the ullage space 211 even when the fuel tank 21 is nearly full. The pressure source 22 may be any source of air at a higher pressure than the air within the ullage space 211 for at least some time periods during normal operation of the fuel storage system 2. The pressure source 22 is communicatively connected to the controller 24 by a communications link 25a, which may be wired or wireless and may use any suitable communications technology. The communications link 25a is configured such that the pressure source 22 is able to receive control signals from the controller 24. In some examples the communications link 25a is configured such that the pressure source 22 is additionally able to send signals to the controller 24. Such signals may, for example, indicate a current operational state of the pressure source 22 (or of a component thereof). The pressure source 22 is a mechanism by which the controller 24 can increase the pressure inside the fuel tank 21.

The pressure source 22 comprises one or more controllable elements, the nature of which depends on the nature of the pressure source 22, and the (or each) controllable element is communicatively connected to the controller 24 by the communications link 25a. The one or more controllable elements may comprise an actuatable valve, a compressor pump, a heat exchanger, or the like. The (or each) controllable element is configured to enable the delivery of pressurised air into the fuel tank 21 from the pressure source 22 to be selectively either permitted (this may involve, e.g., opening a valve and/or activating a compressor pump) or prevented (this may involve, e.g., closing a valve and/or deactivating a compressor pump). In some examples the (or each) controllable element is also configured to vary the flow rate at which pressurised air is delivered into the fuel tank 21 (this may involve, e.g., varying the size of a valve orifice or varying the speed of a compressor pump) and/or to vary the pressure of the pressurised air being delivered.

In some examples the controllable pressure source comprises a controllable valve disposed between the ullage space 211 and a high-pressure environment in which the air pressure is higher than the air pressure in the ullage space 211 for at least some time periods during normal operation of the fuel storage system 2. Such a high-pressure environment may be, for example, a bleed air system of an aircraft or a pressurised region of an aircraft such as the cabin or a cargo bay. In such examples the high-pressure environment is controllably connected to the interior of the fuel tank 21 (for example by an actuatable valve), so that flow of air into the fuel tank 21 can be selectively either permitted or prevented in response to receiving an appropriately configured control signal from the controller 24. In some such examples the connection of the high-pressure environment to the fuel tank 21 is configured such that the flow rate of air into the fuel tank 21 is selectively variable in response to receiving an appropriately configured control signal from the controller 24. In some such examples the controller 24 may be configured to monitor a pressure differential between the ullage space 211 and the high-pressure environment, and to only enable flow therebetween when the high-pressure environment is at a higher pressure than the ullage space 211.

In some examples, the pressure source 22 comprises a compressor connected to the interior of the fuel tank 21. In such examples the compressor is selectively activatable to either supply pressurised air into the fuel tank 21, or to not supply any pressurised air into the fuel tank 21 in response to receiving an appropriately configured control signal from the controller 24. In some such examples the compressor may be controllable (via appropriately configured control signals sent by the controller 24) to selectively vary the rate at which pressurised air is supplied into the fuel tank 21, and/or to selectively vary the pressure of the pressurised air supplied into the fuel tank 21.

In some examples the fuel system 2 may comprise more than one pressure source 22. In such examples the fuel system 2 may comprise two or more different types of pressure source 22. For example, it may be advantageous for the fuel system 2 to comprise both a passive pressure source, such as a pressurised region of an aircraft, which does not require any power in order to deliver pressurised air into the fuel tank 21 provided the pressure in the pressurised region is greater than or equal to the target pressure desired to be achieved in the fuel tank 21, and an active pressure source such as a compressor. The active pressure source can then be used in the event that the pressure in the pressurised region is lower than the target pressure.

The valve 23 may be any type of valve which is controllable to selectively permit or prevent the release of pressurised air from inside the fuel tank 21. Depending on the location of the fuel tank 21, the air may be released to the external environment of the fuel tank 21 or to some other location external to the fuel tank 21. For example, if the fuel tank 21 is located in a pressurised region of an aircraft, the air from inside the fuel tank 21 may be released into a sealed container or to the outside of the aircraft, to avoid contaminating the pressurised region of the aircraft with fuel vapour.

The valve 23 may be an actuatable valve. In some examples in which the pressure source 22 comprises an actuatable valve in communication with a region external to the fuel tank 21, the actuatable valve of the pressure source 22 may also be the pressure-release valve 23. This may be the case, for example, where the nature of the region with which the actuatable valve is in communication is such that it is not problematic for that region to contain fuel vapours.

In some examples the valve 23 may be a one way valve, configured to prevent air from entering the fuel tank 21. In some examples the valve 23 may be configured to automatically open in response to the pressure inside the fuel tank exceeding a predetermined threshold. The valve 23 is a mechanism by which the controller 24 can decrease the pressure inside the fuel tank 21. In some examples the valve 23 is a two-way valve, configured to selectively permit air to flow out of the fuel tank 21, or to permit air to flow into the fuel tank 21. In such examples the valve is a mechanism by which the controller can both increase and decrease the pressure inside the fuel tank 21, depending on whether the pressure inside the fuel tank 21 is higher or lower than the pressure of the external region with which the valve 23 is in communication (when open). The valve 23 may be located at or near the top of the fuel tank 21, so that it will be in the ullage space 211 even when the fuel tank 21 is nearly full.

The valve 23 is communicatively connected to the controller 24 by a communications link 25b, which may be wired or wireless and may use any suitable communications technology. The communications link 25b is configured such that the valve 23 is able to receive control signals from the controller 24. In some examples the communications link 25b is configured such that the valve 23 is additionally able to send signals to the controller 24. Such signals may, for example, indicate a current operational state (such as open; closed; partially open; or the like) of the valve 23.

As mentioned above, the pressure release valve 23 is an optional feature of the fuel storage system 2. For many potential applications of the fuel storage system 2 it is expected that there will be no need to actively reduce the ullage pressure during operation of the fuel storage system 2.

In some examples the fuel storage system 2 comprises a further pressure release valve (not shown), which need not be controllable. The further pressure release valve is configured to allow air to flow out of the ullage space 211 of the fuel tank 21 in the event that the pressure of the ullage space 211 exceeds a predetermined threshold. The further pressure release valve may be configured to cease allowing air to flow out of the ullage space 211 when the pressure of the ullage space equals the predetermined threshold. The predetermined threshold may be set based on the structural properties of the fuel tank 21. In some examples the further pressure release valve may be a burst disk.

Optionally the fuel storage system 2 comprises a temperature sensor 26. The temperature sensor 26 is located within the fuel tank 21, at a location where it is able to measure the temperature of the fuel 212 in most or all possible operational states of the fuel storage system 2. For example, the temperature sensor 26 may be located at or near the bottom of the fuel tank 21, so that it will be in contact with the fuel 212 even when the fuel tank 21 is nearly empty. The temperature sensor 26 may use any suitable sensing technology.

The temperature sensor 26 is communicatively connected to the controller 24 by a communications link 25c, which may be wired or wireless and may use any suitable communications technology. The communications link 25c is configured such that the temperature sensor 26 is able to send signals containing measured temperature values to the controller 24. In some examples the communications link 25c is configured such that the controller 24 is additionally able to send signals to the temperature sensor 26. Such signals may, for example, be configured to cause the temperature sensor 26 to send a current measured temperature value to the controller 24.

A current measured value (of any parameter used by the controller 24) is considered to be a measured value that is representative of the state of the parameter being measured, at the time at which the value is sent. It may typically be the most recent measured value. It may have been acquired a short time before it is sent, or substantially at the same time as being sent. The time period after acquisition during which a measured value is considered by the system 2 (e.g. by the controller, or by the sensor which acquired the measured value) to be current may depend on the expected rate of change of the parameter being measured.

Optionally the fuel storage system 2 comprises a fuel tank pressure sensor 27. The fuel tank pressure sensor 27 is located within the fuel tank 21, at a location where it is able to measure the air pressure in the ullage space 211 in most or all possible operational states of the fuel storage system 2. For example, the fuel tank pressure sensor 27 may be located at or near the top of the fuel tank 21, so that it will be in the ullage space 211 even when the fuel tank 21 is nearly full. The fuel tank pressure sensor 27 may use any suitable sensing technology.

The fuel tank pressure sensor 27 is communicatively connected to the controller 24 by a communications link 25d, which may be wired or wireless and may use any suitable communications technology. The communications link 25d is configured such that the fuel tank pressure sensor 27 is able to send signals containing measured pressure values to the controller 24. In some examples the communications link 25d is configured such that the controller 24 is additionally able to send signals to the fuel tank pressure sensor 27. Such signals may, for example, be configured to cause the fuel tank pressure sensor 27 to send a current measured pressure value to the controller 24.

Optionally the fuel storage system 2 comprises an environment pressure sensor 28. The environment pressure sensor 28 is located in the external environment surrounding the fuel tank 21. For example, the environment pressure sensor 28 may be mounted on an outer surface of the fuel tank 21. The environment pressure sensor 28 may use any suitable sensing technology. The environment pressure sensor 28 is communicatively connected to the controller 24 by a communications link 25e, which may be wired or wireless and may use any suitable communications technology. The communications link 25e is configured such that the environment pressure sensor 28 is able to send signals containing measured pressure values to the controller 24. In some examples the communications link 25e is configured such that the controller 24 is additionally able to send signals to the environment pressure sensor 28. Such signals may, for example, be configured to cause the environment pressure sensor 28 to send a current measured pressure value to the controller 24.

In some examples the environment pressure sensor 28 may be comprised in a different system, with which the controller 24 is in communication. For example, if the fuel storage system 2 is installed on an aircraft and the fuel tank 21 is located in a cargo bay of that aircraft, such a different system may be a cargo bay pressurisation system. In such examples the controller 24 may be in direct communication with the environment pressure sensor 28, or it may be in communication with a controller of the different system.

In some examples in which the fuel storage system 2 does not comprise the environment pressure sensor 28, the controller 24 may be configured to generate a predicted value of the current pressure of the external environment of the fuel tank 21. The controller 24 may, for example, be configured to generate such a predicted value based on pre-programmed information relating to the external environment of the fuel tank 21. In some examples, the controller 24 may perform the generation of the predicted pressure value using information relating to how the pressure of the external environment is expected to change over time and/or in response to changing external factors (external pressure evolution information). Such information may be in the form of a model of external pressure behaviour, or a look-up table, or the like. The controller 24 may be pre-programmed with the external pressure evolution information.

In examples in which the fuel storage system 2 is installed on an aircraft, the external pressure evolution information may comprise information about how the pressure of the external environment of the fuel tank 21 is expected to change over the course of a flight cycle of the aircraft. The external pressure evolution information may be specific to the particular type of aircraft, or even the particular aircraft. The external pressure evolution information may be specific to the particular route being flown by the aircraft. In some examples the external pressure evolution information may comprise known relationships between the pressure of the external environment of the fuel tank 21 and one or more flight-related parameters. In such examples the controller 24 is configured to receive current values of the one or more flight-related parameters during the course of operation of the fuel storage system 2. Such flight-related parameters may include any one or more of: an altitude of an aircraft on which the fuel storage system 2 is installed; a flight phase (e.g. refuel, taxi-out, take off, cruise, descent, landing and taxi-in) of an aircraft on which the fuel storage system 2 is installed; a current location of an aircraft on which the fuel storage system 2 is installed; a current elapsed flight time of an aircraft on which the fuel storage system 2 is installed; information about the route being flown by an aircraft on which the fuel storage system 2 is installed; type of an aircraft on which the fuel storage system 2 is installed; or the like.

In examples in which the fuel tank 21 is located in a pressurised region of an aircraft, such as a cabin or cargo bay, the pressure within the pressurised region will typically be controlled in a known manner over the course of a flight. For most aircraft, it can generally be assumed that the external environment pressure when the aircraft is on the ground will be equal to atmospheric pressure, and will vary according to a predefined pressure profile when the aircraft is in flight. In such examples the controller 24 may be pre-programmed with external pressure evolution information which relates external environment pressure to one or more flight-related parameters, and is configured to receive current values of the one or more flight-related parameters.

The controller 24 is configured to regulate the pressure within the fuel tank 21, by controlling the pressure source 22 (and/or the valve 23, if present) to achieve a desired target pressure in the ullage space 211. In some examples the controller 24 is configured to control the pressure source 22 (and/or the valve 23, if present) based on a measured or predicted value for the current pressure in the external environment of the fuel tank 21. In examples in which the fuel storage system 2 comprises the fuel tank pressure sensor 27, the controller 24 is configured to control the pressure source 22 (and/or the valve 23, if present) based on a current measurement of the pressure in the ullage space 211 of the fuel tank 21 received by the controller 24 from the fuel tank pressure sensor 27.

For example, if the controller 24 determines that the pressure in the fuel tank 21 needs to increase, the controller 24 sends a signal to the pressure source 22 configured to cause the pressure source 22 to deliver pressurised air into the fuel tank 21. The control signal may be configured to cause the pressure source 22 to deliver a particular amount of pressurised air into the fuel tank 21, such amount being determined by the controller 24 to be appropriate for increasing the pressure inside the fuel tank 21 to the target pressure. Alternatively, in examples where the controller 24 receives current fuel tank pressure measurements from the fuel tank pressure sensor 27, the controller 24 may monitor the pressure inside the fuel tank 21 and send a further control signal configured to cause the pressure source 22 to stop delivering pressurised air when the controller 24 determines that the pressure in the fuel tank 21 equals the target pressure.

In examples in which the fuel system 2 comprises more than one pressure source 22, the controller 24 is configured to select a pressure source to activate to achieve the target pressure. For example, if the fuel system 2 comprises a first pressure source 22 in the form of a pressurised region which may not necessarily be at a pressure greater than or equal to the target pressure, and a second pressure source 22 in the form of a compressor, the controller 24 is configured to determine the pressure of the pressurised region and to select either the first or the second pressure source 22 in dependence on whether the pressure in the pressurised region is less than the target pressure.

In examples in which the pressure release valve 23 is present in the fuel storage system 2, if the controller 24 determines that the pressure in the fuel tank 21 needs to decrease, it sends a control signal to the valve 23 configured to cause the valve 23 to release air from the fuel tank 21. The control signal may be configured to cause the valve 23 to release a particular amount of air from the fuel tank 21, such amount being determined by the controller 24 to be appropriate for decreasing the pressure inside the fuel tank 21 to the target pressure. Alternatively the controller 24 may monitor the pressure inside the fuel tank 21 and send a further control signal configured to cause the valve 23 to stop releasing air when the controller 24 determines that the pressure in the fuel tank 21 equals the target pressure Situations in which the pressure inside the fuel tank cannot be decreased by opening the valve 23 (e.g. because the valve 23 is not present, or because the target pressure is below the pressure of the external environment), may arise in some envisaged applications of the invention. In such a situations there is little or no disadvantage associated with maintaining the pressure inside the fuel tank equal to the external environmental pressure, since flammability is less at higher pressures, particularly if the fuel tank is located in an unpressurised environment. Consequently, in some examples the controller 24 is configured to adjust the target pressure to be equal to a current pressure of the external environment if it is determined by the controller 24 that the target pressure is less than the current pressure of the external environment. Alternatively or additionally, the controller 24 may be pre-programmed with a minimum allowable pressure, in which case it is configured to adjust the target pressure to be greater than or equal to the minimum allowable pressure when necessary, as will be explained in more detail below. Similarly, the controller 24 may be pre-programmed with a maximum allowable pressure, in which case it is configured to adjust the target pressure to be less than or equal to the maximum allowable pressure when necessary, as will also be explained below.

The controller 24 is configured to regulate the pressure inside the fuel tank 21 so as to maintain the flammability of the fuel tank 21 at or below a desired level. In particular, the controller 24 is configured to regulate the pressure inside the fuel tank 21 so as to maintain the flammability of the fuel tank 21 lower than a predefined flammability threshold defined for the applicable fuel type (that is, the fuel type of the fuel 212 contained in the fuel tank 21 at the time the controller 24 is doing the regulating). The predefined flammability threshold may have the form of a temperature-pressure curve such as any of the curves A, B, C of FIG. 1. The predefined flammability threshold may be defined such that the fuel tank is not flammable when it is below the predefined flammability threshold. The predefined flammability threshold depends on the temperature of the fuel in the fuel tank, the pressure in the ullage space, and the chemical properties of the fuel in the fuel tank. The predefined flammability threshold may correspond to a flammability less than or equal to a lower flammability limit (LFL) of the particular fuel type for which the predefined flammability threshold is defined. The predefined flammability threshold for a given fuel type may be determined as a function of the flash point of the fuel type, fuel temperature, and fuel tank pressure.

As part of a process of regulating the pressure in the fuel tank 21, the controller 24 may determine a target pressure, as will be described below. This target pressure is determined based on the applicable predefined flammability threshold, and is a pressure at which the flammability of the fuel tank is less than or equal to that predefined flammability threshold. In some examples the target pressure may be considered to be a minimum ullage pressure, since it represents the lowest ullage pressure at which the fuel tank is not flammable when the fuel 212 contained in the fuel tank is at the current fuel temperature. In such examples the controller 24 may be configured to control the ullage pressure to be at least (that is, greater than or equal to) the target pressure.

As mentioned above, the chemical properties of fuel vary between batches and this means that is often not possible or practicable to know precisely the chemical properties of the fuel 112 within the tank at any given time during operation of the fuel storage system 1, even if the type of that fuel is known. This issue may be addressed by defining the predefined flammability threshold to correspond to a flammability level which is lower than the flash point of the particular fuel type. For example, the predefined flammability threshold may be lower by a predetermined amount than the mean flash point of the particular fuel type. The predefined flammability threshold may be lower by at least one standard deviation than the mean flash point of the particular fuel type.

The controller 24 is pre-programmed with at least one predefined flammability threshold in respect of each particular type of fuel 212 expected to be stored in the fuel tank 21. By "pre-programmed" it is meant that the controller 24 comprises, or is in communication with, a memory storing the at least one predefined flammability threshold. A predefined flammability threshold may be stored, for example, in the form of a set of paired temperature and pressure values, labelled with the fuel type to which that predefined flammability threshold applies. In the illustrated example the controller 24 comprises an internal memory 241, which stores the at least one predefined flammability threshold.

The controller 24 may additionally be pre-programmed with other information which does not change over the course of the operation of the fuel storage system 2. Such other information pre-programmed into the controller 24 may include, for example, any one or more of: a known relationship between the temperature of the fuel 212 in the fuel tank 21 and a different measurable parameter; information relating to how the temperature of the fuel 212 is expected to change over time and/or in response to changing external factors (fuel temperature evolution information); a minimum allowable pressure for the fuel tank 21; a maximum allowable pressure for the fuel tank 21; a maximum allowable difference between the pressure inside the fuel tank 21 and the pressure of the external environment of the fuel tank 21.

The controller 24 is configured to determine a target pressure for the fuel tank 21 at a given time based on information relating to a temperature of the fuel 212 inside the fuel tank 21 at the given time (hereinafter referred to as fuel temperature information). The given time may be the current time. It may be appropriate for the given time to be the current time in examples where any delay associated with achieving the target pressure inside the fuel tank 21 is expected to be small. This may be the case, for example, if any required pressure change is expected to be very small (e.g. because the pressure in the fuel tank is being continuously regulated), or if the pressure source 22 (and valve 23 if present) are configured to be able to rapidly change the pressure inside the fuel tank 21.

However; in other examples there may be a significant time delay associated with achieving the target pressure inside the fuel tank 21. In such examples the controller 24 may be configured to account for such a time delay. This may be achieved, for example, by the given time being later than the current time by an amount substantially equal to a time delay associated with altering the pressure in the ullage space 211. In other words, the given time is a future given time. In such examples the controller 24 may be pre-programmed with pressure change information relating to how quickly the pressure in the ullage space 211 is expected to change in response to activation of the pressure source 22 (and opening of the pressure release valve 23, if present). Such pressure change information may depend on factors such as the nature of the pressure source 22, the nature of the pressure release valve 23 (if present), the size of the fuel tank 21, and the like. The time delay for a given desired pressure change can be calculated using the pressure change information.

In order to determine the target pressure for the fuel tank 21 at a future given time, the controller 24 requires information relating to a temperature of the fuel 212 inside the fuel tank 21 at the future given time. The controller may be configured to calculate, for example, a predicted fuel temperature for the future given time based on current fuel temperature information and a current rate of change of the fuel temperature (which may, for example, be calculated using historical fuel temperature information).

The fuel temperature information may be any information from which the temperature of the fuel 212 at the given time is derivable, either directly or indirectly. In examples in which the fuel storage system 2 comprises the temperature sensor 27, the fuel temperature information may comprise a recent measured value of the temperature of the fuel 212 inside the fuel tank 21.

Alternatively, the fuel temperature information may comprise a recent measured value of a different parameter which is correlated in a known manner with the temperature of the fuel 212. Such a different parameter may be, for example, a measured temperature of the external environment of the fuel tank 21. In examples in which the fuel tank 21 is an aircraft ACT, the different parameter may be a measured temperature of the cabin or cargo bay in which the ACT is located. In some examples the different parameter may be a measured temperature of fuel inside a different fuel tank. Where the fuel storage system 2 is installed in an aircraft, for example, the different fuel tank may be a further fuel tank of that aircraft. The different fuel tank comprises a temperature sensor, which is directly or indirectly in communication with the controller 24, for example in the same manner as the temperature sensor 26 In examples in which the fuel temperature information comprises a measured value of a different parameter, the controller 24 may be configured to process the fuel temperature information to generate a calculated value for the temperature of the fuel 212 inside the fuel tank 21 at the given time. The processing may be based on the measured value of the different parameter and a known relationship between the different parameter and the temperature of the fuel 212. In such examples the known relationship is pre-programmed into the controller 24.

In some examples the fuel temperature information comprises a predicted value of the temperature of the fuel 212 inside the fuel tank 21 at the given time. The controller 24 may, for example, be configured to generate such a predicted value based on a measured temperature of the fuel 212 at an earlier time (such as a time at which the fuel was put into the fuel tank 21). The measured temperature of the fuel 212 at the earlier time may have been measured by the temperature sensor 26. The measured temperature of the fuel 212 may have been acquired as part of a refuelling process of an aircraft on which the fuel storage system 2 is installed. In examples in which the controller 24 generates a predicted value based on a measured temperature of the fuel 212 at an earlier time, the controller 24 may perform the generation using information relating to how the temperature of the fuel 212 is expected to change over time and/or in response to changing external factors (hereinafter referred to as fuel temperature evolution information). Such information may be in the form of a model of fuel temperature behaviour. The controller 24 may be pre-programmed with the fuel temperature evolution information.

In examples in which the fuel storage system 2 is installed on an aircraft, the fuel temperature evolution information may comprise information about how the temperature of the fuel 212 is expected to change over the course of a flight cycle of the aircraft. The fuel temperature evolution information may be specific to the particular type of aircraft, or even the particular aircraft. For example, the fuel temperature evolution information may be based on or take account of aircraft specific details such as the location of the fuel tank 21, and/or which aircraft systems surround and/or are immersed in the fuel tank 21, since these details may affect fuel temperature during flight. Similarly, the fuel temperature evolution information may be based on or take account of specific details of the fuel storage system 2, such as the material and configuration of the fuel tank 21, since such details may affect heat transfer between the fuel 212 to the external environment of the fuel tank 21. The fuel temperature evolution information may be specific to the particular route being flown by the aircraft. In some examples the fuel temperature evolution information may comprise known relationships between fuel temperature in the fuel tank 21 and one or more external parameters. In such examples the controller 24 is configured to receive current values of the one or more external parameters during the course of operation of the fuel storage system 2.

Such external parameters may include any one or more of: an altitude of an aircraft on which the fuel storage system 2 is installed; a flight phase of an aircraft on which the fuel storage system 2 is installed; a current location of an aircraft on which the fuel storage system 2 is installed; a current elapsed flight time of an aircraft on which the fuel storage system 2 is installed; information about the route being flown by an aircraft on which the fuel storage system 2 is installed; type of an aircraft on which the fuel storage system 2 is installed; a measured temperature of the external environment of the fuel tank 21; or the like. For some of these external parameters a predetermined fixed value may be used by the controller 24, in which case the predetermined fixed value may be pre-programmed into the controller 24.

Thus, the controller 24 is configured to generate the predicted fuel temperature value based on a historical measured temperature of the fuel 212 inside the fuel tank 21, or a historical measured temperature of fuel inside a different fuel tank, in combination with pre-programmed fuel temperature evolution information; and optionally in combination with current values of one or more external parameters.

The controller 24 determines the target pressure based on the fuel temperature information using a predefined flammability threshold as described above. In examples in which the controller 24 is pre-programmed with predefined flammability thresholds for multiple different fuel types, the controller 24 may be configured to receive fuel type information indicative of a type of fuel currently contained in the fuel tank 21, and to select one of the predefined flammability thresholds based on the received fuel type information. Such fuel type information may, for example, be manually input by an operator at a time of putting the fuel 212 into the fuel tank 21. In some examples the fuel storage system 2 may comprise sensor equipment suitable for automatically detecting the type of fuel present in the fuel tank 21, in which case the fuel type information may be received by the controller 24 from such sensor equipment.

In some examples (particularly examples in which the fuel tank 21 is located in a pressurised region of an aircraft) the controller 24 is configured to determine the target pressure additionally based on a predefined minimum allowable pressure for the fuel tank 21. The minimum allowable pressure for the fuel tank 21 is pre-programmed into the controller 24. The level of the minimum allowable pressure is set based on the specific design of the fuel tank 21 and of a fuel system to which the fuel tank 21 is connected. In particular, the minimum allowable pressure may be set based on the structural capability of the fuel tank 21 to withstand a pressure differential between the inside of the fuel tank 21 and the external environment. Alternatively or additionally, the minimum allowable pressure may be set based on the requirements of a fuel transfer mechanism used by the fuel storage system 2 to transfer fuel out of the fuel tank 21. Some fuel transfer mechanisms rely on a certain minimum pressure being maintained inside the fuel tank 21.

In some examples (particularly examples in which the fuel tank 21 is located in an unpressurised region of an aircraft) the controller 24 is configured to determine the target pressure additionally based on a predefined maximum allowable pressure for the fuel tank 21. The maximum allowable pressure for the fuel tank 21 is pre-programmed into the controller 24. The level of the maximum allowable pressure is set based on the specific design of the fuel tank 21 and of a fuel system to which the fuel tank 21 is connected. In particular, the maximum allowable pressure may be set based on the structural capability of the fuel tank 21 to withstand a pressure differential between the inside of the fuel tank 21 and the external environment.

In some examples the controller 24 may be configured to determine the target pressure additionally based on a predefined maximum allowable pressure for the fuel tank 21 and a predefined minimum allowable pressure for the fuel tank 21. In such examples the target pressure must be between the minimum allowable pressure and the maximum allowable pressure.

Figure 3:
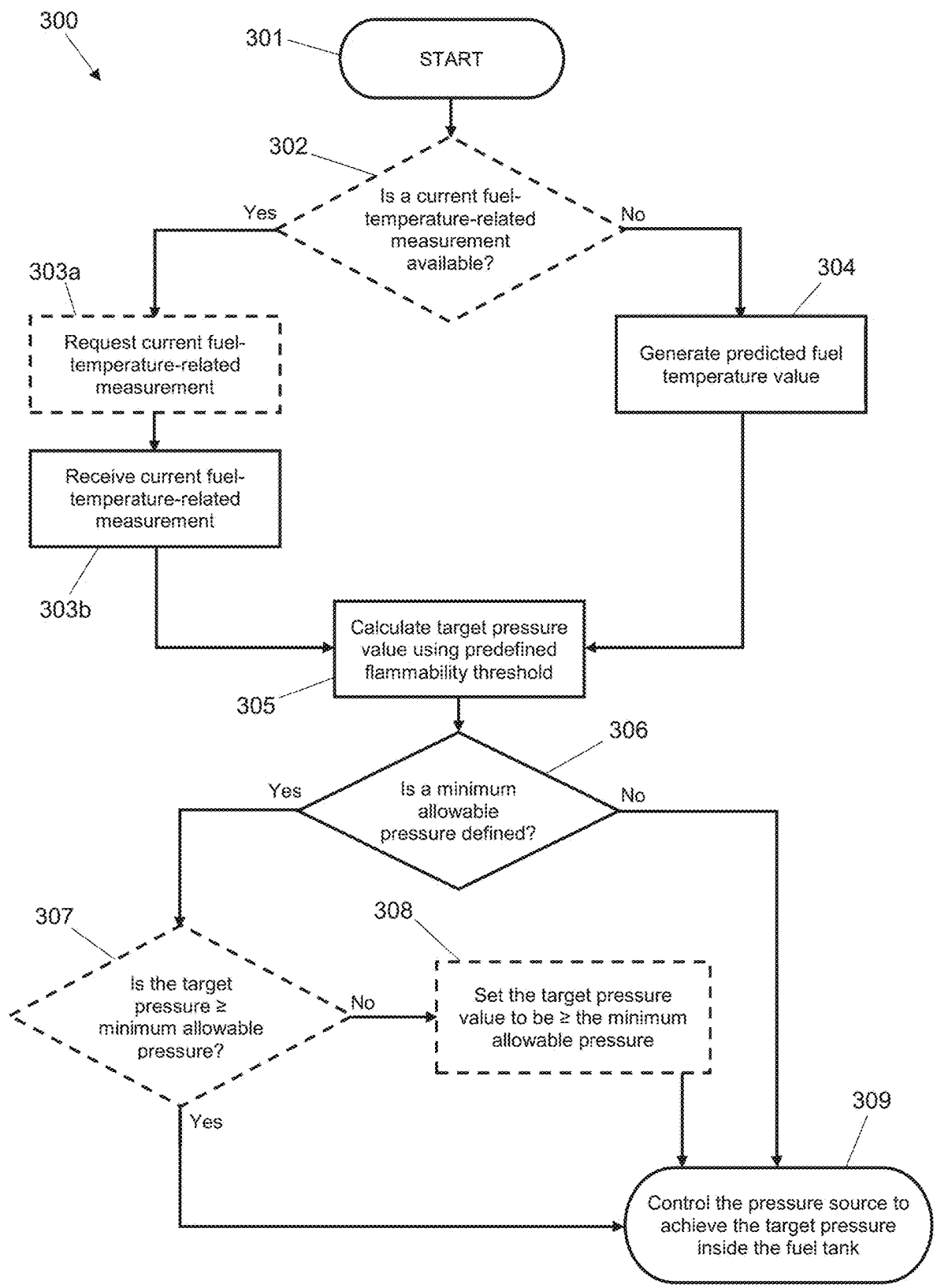
FIG. 3 is a flow chart illustrating an example process which may be performed by the fuel storage system of FIG. 2.

FIG. 3 is a flow chart illustrating an example process 300 by which the controller 24 may regulate the pressure inside the fuel tank 21. Steps which are not essential and therefore need not be followed in all examples of the invention are represented using dashed lines. The process 300 is applicable to examples of the invention in which the pressure in the external environment of the fuel tank 21 is likely to be higher than the ullage pressure, such as with fuel tanks located in pressurized regions of aircraft.

The process 300 starts at block 301. There are various possible triggers which may cause the controller 24 to start the process 300. One such trigger may be that a certain amount of time has passed since the last time the controller 24 performed the process 300. For example, the controller 24 may be configured to perform the process 300 at predefined time intervals, such as every minute, or every ten minutes. In such examples the length of the predefined time intervals may be set based on how quickly the temperature of the fuel 212 is expected to change during normal operation of the fuel storage system 2. Other possible triggers include the temperature of the fuel 212 changing by more than a predefined amount from its value the last time the process 300 was performed; a change of flight phase; the aircraft reaching a predefined altitude, the aircraft having used a predefined amount of fuel; and completion of the process 300 (in this case the controller 24 is effectively configured to perform the process 300 continuously).

In a second block 302 of the example process 300, the controller 24 determines whether a current fuel-temperature-related measurement is available. A fuel-temperature-related measurement may be a measured value of the temperature of the fuel 212. However; a fuel-temperature-related measurement may also be a measured value of a different parameter (not necessarily a fuel temperature) from which the controller 24 is able to derive the temperature of the fuel 212 in the tank 21, as discussed above. Block 302 is indicated as optional, because in some examples the controller 24 may be pre-programmed with fixed information about what measurement data is available to it. In such examples the controller 24 does not actively determine whether a current fuel-temperature-measurement is available when performing the process 300. Instead the first block of the process is block 303a or 303b (if the controller 24 is pre-programmed to use measured fuel temperature values) or block 304 (if the controller 24 is pre-programmed to generate and use predicted fuel temperature values).

In examples in which the process 300 includes block 302, the controller 24 performs block 302 by actively determining whether a current fuel-temperature-related measurement is available each time the process 300 is performed. For example, the controller 24 may check whether a recently acquired fuel-temperature-related measurement is already stored in the memory 241 (this may be the case if a sensor is configured to continuously push new measurement data to the controller 24). Alternatively or additionally, performing block 302 may comprise the controller 24 signalling a sensor from which it is configured to receive fuel-temperature-related measurements, to check that the sensor and/or communications link with the sensor are functional.

Responsive to a positive determination resulting from block 302 (for example, when the controller 24 finds a recent fuel-temperature-related measurement in its memory 241, or confirms that it is in communication with a functioning sensor), the process moves either to optional block 303a and then block 303b, or directly to block 303b.

Optional block 303a comprises requesting a current fuel-temperature-related measurement. The request may be made to the memory 241 of the controller 24, or to a sensor with which the controller 24 is in direct communication, such as the temperature sensor 26. Alternatively the request may be made to a controller of a different system, the different system comprising or being in communication with a sensor configured to measure a fuel-temperature-related parameter (which may be either the temperature of the fuel 212 in the tank 21 or a different parameter from which the temperature of the fuel 212 in the tank 21 is derivable). Performing block 303a comprises the controller 24 sending a control signal to the sensor (or other controller) configured to cause the sensor/controller to reply with a current measured value. In some examples the control signal may be configured to cause the sensor/controller to obtain and then send a current measured value. Optional block 303a is not present in the process 300 in examples in which the controller 24 is in communication with a sensor or other controller which is configured to automatically push updated fuel-temperature-related measurements to the controller 24.

In block 303b, a current fuel-temperature-related measurement is received by the controller 24. The measurement may be received from the memory 241 of the controller 24. Alternatively the measurement may be received from a sensor or other controller with which the controller 24 is in communication (such as the temperature sensor 26). The received fuel-temperature-related measurement may comprise a measured value of the temperature of the fuel 212 in the tank 21 or a measured value of a different parameter from which the temperature of the fuel 212 in the tank 21 is derivable by the controller 24.

In examples in which the process 300 includes optional block 303a, the current fuel-temperature-related measurement is received in response to the request issued by the controller 24 in block 303a. In other examples, the current fuel-temperature-related measurement is received without the controller 24 having issued a request. Such examples include examples in which a sensor or other controller is configured to automatically push updated fuel-temperature-related measurements to the controller 24, either continuously or at predefined intervals.

Upon completion of block 303b, the controller 24 has available a current fuel-temperature-related measurement. This measurement is then used by the controller 24 to perform the remaining blocks of the process 300. In examples in which the current fuel-temperature-related measurement is a measured value of a different parameter from which the temperature of the fuel 212 in the tank 21 is derivable, the controller 24 may be configured to derive a current temperature of the fuel 212 using current fuel-temperature-related measurement and may then use the derived current temperature of the fuel 212 in the tank 21 to perform the remaining blocks of the process 300.

Responsive to a negative determination resulting from block 302 (for example, when the controller 24 finds that it does not have a recent fuel-temperature-related measurement in its memory 241, and/or finds that it is not in communication with a functioning sensor, for whatever reason), the process moves to block 304. In block 304 a predicted value for the temperature of the fuel 212 in the tank 21 is generated by the controller 24. The controller 24 may generate the predicted value in the manner described above, using fuel temperature evolution information stored on the memory 241 in combination with a historical value of the temperature of the fuel 212 in the tank 21 and/or a historical value of a different parameter from which the temperature of the fuel 212 in the tank 21 is derivable. In examples in which the controller 24 generates the predicted value using a historical value of such a different parameter, the controller 24 may be configured to derive a historical value of the temperature of the fuel 212 in the tank 21 using the historical value of the different parameter together with pre-programmed relationship between the different parameter and the temperature of the fuel 212. The controller 24 may then use the derived historical value of the temperature of the fuel 212 in the tank 21 to generate the predicted value.

Upon completion of block 304, the controller 24 has available a predicted current fuel temperature value. This predicted value is then used by the controller 24 to perform the remaining blocks of the process 300.

In block 305 a target pressure value is calculated by the controller 24, using a predefined flammability threshold, in the manner described above. In some examples the target pressure value may be a minimum ullage pressure value. In some examples, performing block 305 may comprise the controller 24 selecting, in the manner described above, a particular predefined flammability threshold from multiple such thresholds stored in its memory 241. In examples of the process where a current fuel-temperature-related measurement is available to the controller 24, the controller 24 uses the current fuel-temperature-related measurement (or a current fuel temperature derived therefrom) in conjunction with the predefined flammability threshold to calculate the target pressure. In examples of the process where a current fuel-temperature-related measurement is not available to the controller 24, the controller 24 uses the predicted fuel temperature value generated in block 304 in conjunction with the predefined flammability threshold to calculate the target pressure. In some examples, the calculated target pressure value may be a current target pressure value, if it is based on a measured or predicted current fuel temperature value. In other examples the calculated target pressure value may be for some time in the future, in order to account for a time delay associated with altering the pressure in the fuel tank 21. A future target pressure value may be calculated in the manner described above.

In block 306 it is determined whether a minimum allowable pressure is defined. Performing block 306 may comprise, for example, the controller 24 checking whether a minimum allowable pressure is stored on its memory 241, and/or retrieving the value of such a minimum allowable pressure. A minimum allowable pressure may be specific to the particular fuel tank 21 comprised in the fuel storage system 2. A minimum allowable pressure has the features described above.

Responsive to a positive determination in block 306 (that is, when the controller has found that a minimum allowable pressure for the fuel tank 21 is stored on the memory 241, or is otherwise pre-programmed onto the controller 24), the process 300 moves to block 307. Blocks 307 and 308 are optional, since they are not present in examples of the process 300 which are performed by controllers 24 that have not been pre-programmed with a minimum allowable pressure.

In block 307 the target pressure (as calculated in block 305) is compared to the minimum allowable pressure by the controller 24. The possible results of the comparing are that the target pressure is greater than the minimum allowable pressure, the target pressure is equal to the minimum allowable pressure, or the target pressure is less than the minimum allowable pressure. The controller 24 may use any suitable processing technique to perform block 307.

If the outcome of performing block 307 is that the target pressure is less than the minimum allowable pressure, the process moves to block 308. In block 308 the target pressure value is set to be greater than or equal to the minimum allowable pressure. In some examples the controller 24 is configured to set the target pressure to be equal to the minimum allowable pressure. In other examples the controller is configured to set the target pressure to be greater than the minimum allowable pressure, for example by a predetermined amount. Performing block 307 involves increasing the target pressure. Referring to FIG. 1, it can be seen that increasing the pressure decreases the flammability, so setting a minimum allowable pressure is advantageous for flammability reduction as well as for potentially enabling the structure of the fuel tank 21 to be less robust. Upon completion of block 308 the process moves to block 309.

Responsive to a negative determination in block 306 (that is, when the controller 24 determines that it has not been pre-programmed with a minimum allowable pressure), the process moves directly to block 309.

In block 309 the controller 24 controls the pressure source 22 (and/or the valve 23, if present) so as to achieve the target pressure inside the fuel tank 21. Achieving the target pressure inside the fuel tank 21 may mean that the ullage pressure 21 is substantially equal to the target pressure. In examples in which the target pressure is a minimum ullage pressure, achieving the target pressure inside the fuel tank 21 may mean that the ullage pressure is greater than or equal to the target pressure. Achieving the target pressure inside the fuel tank 21 may mean that the ullage pressure 21 is greater than or equal to the target pressure and less than or equal to the pressure of the external environment of the fuel tank 21. The controlling of the pressure source 22 (and the valve 23, if present) by the controller 24 is done in the manner described above, which is dependent on whether or not the controller has a current value (either measured or predicted) of the external environment pressure available to it. Completion of block 309 represents the end of the process 300. In some examples, completion of block 309 may trigger the process 300 to start again from block 301, either immediately or after a predetermined time period has elapsed after the completion of block 309. In other examples a further performance of the process 300 may be triggered in any of the manners discussed above in relation to block 301.

Figure 4:
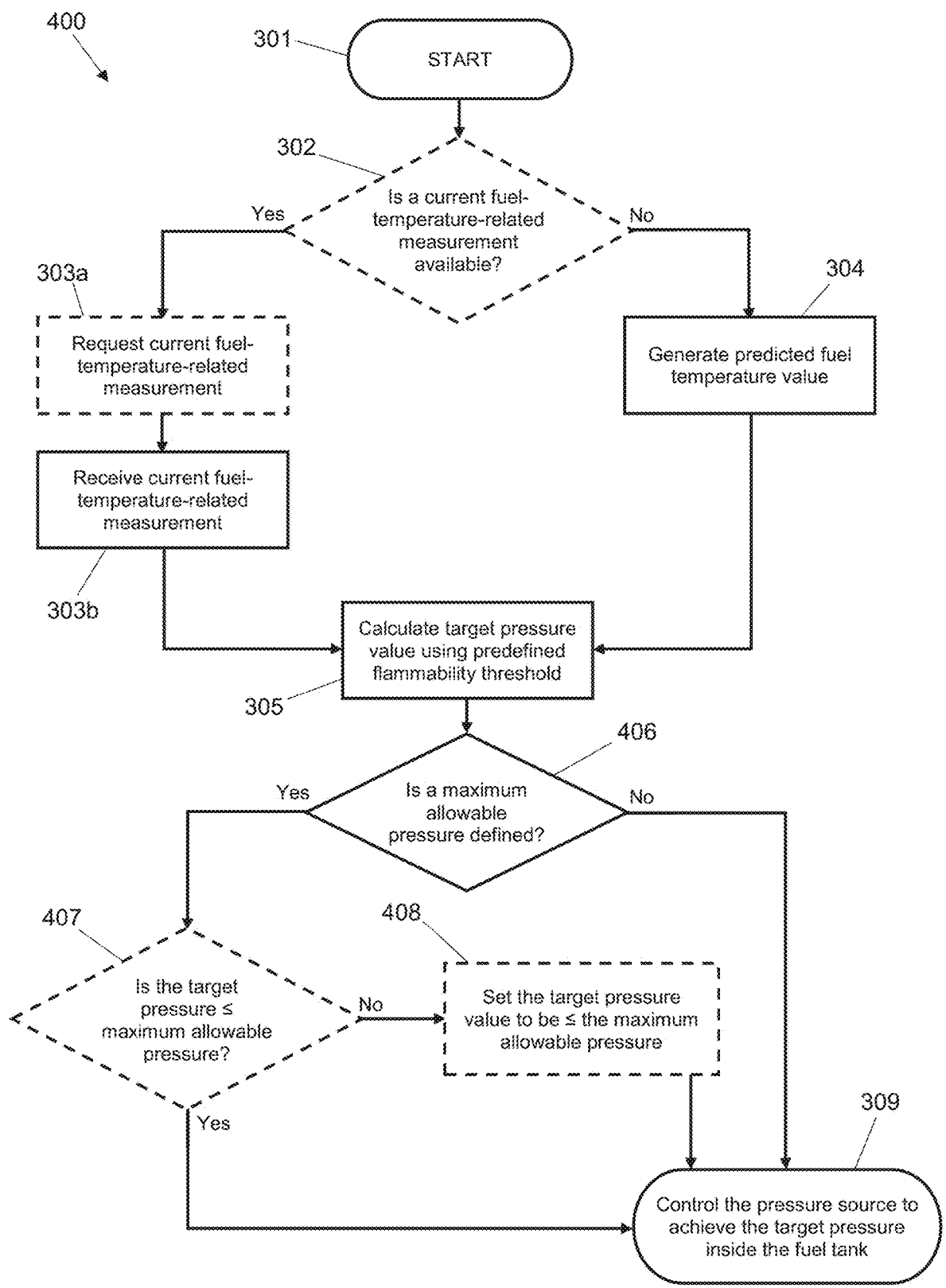
FIG. 4 is a flow chart illustrating a further example process which may be performed by the fuel storage system of FIG. 2.

FIG. 4 is a flow chart illustrating an alternative example process 400 by which the controller 24 may regulate the pressure inside the fuel tank 21. The process 400 is applicable to examples of the invention in which the pressure in the external environment of the fuel tank 21 is likely to be lower than the ullage pressure, such as with fuel tanks located in unpressurized regions of aircraft.

Blocks 309-305 and 309 of the process 400 are common with the example process 300, so the discussion of these blocks provided above applies.

In block 406 it is determined whether a maximum allowable pressure is defined. Performing block 406 may comprise, for example, the controller 24 checking whether a maximum allowable pressure is stored on its memory 241, and/or retrieving the value of such a maximum allowable pressure. A maximum allowable pressure may be specific to the particular fuel tank 21 comprised in the fuel storage system 2. A maximum allowable pressure has the features described above.

Responsive to a positive determination in block 406 (that is, when the controller has found that a maximum allowable pressure for the fuel tank 21 is stored on the memory 241, or is otherwise pre-programmed onto the controller 24), the process 400 moves to block 407. Blocks 407 and 408 are optional, since they are not present in examples of the process 400 which are performed by controllers 24 that have not been pre-programmed with a maximum allowable pressure.

In block 407 the target pressure (as calculated in block 305) is compared to the maximum allowable pressure by the controller 24. The possible results of the comparing are that the target pressure is greater than the maximum allowable pressure, the target pressure is equal to the maximum allowable pressure, or the target pressure is less than the maximum allowable pressure. The controller 24 may use any suitable processing technique to perform block 407.

If the outcome of performing block 407 is that the target pressure is greater than the maximum allowable pressure, the process moves to block 408. In block 408 the target pressure value is set to be less than or equal to the maximum allowable pressure. In some examples the controller 24 is configured to set the target pressure to be equal to the maximum allowable pressure. In other examples the controller is configured to set the target pressure to be less than the maximum allowable pressure, for example by a predetermined amount. Performing block 407 involves reducing the target pressure. Referring to FIG. 1, it can be seen that reducing the pressure increases the flammability, so it may be necessary for the controller to then implement a different flammability reduction mechanism, such as cooling the fuel in the fuel tank or introducing inert gas into the ullage space. Upon completion of block 408 the process moves to block 309.

Responsive to a negative determination in block 406 (that is, when the controller 24 determines that it has not been pre-programmed with a maximum allowable pressure), the process moves directly to block 309.

Figure 5:
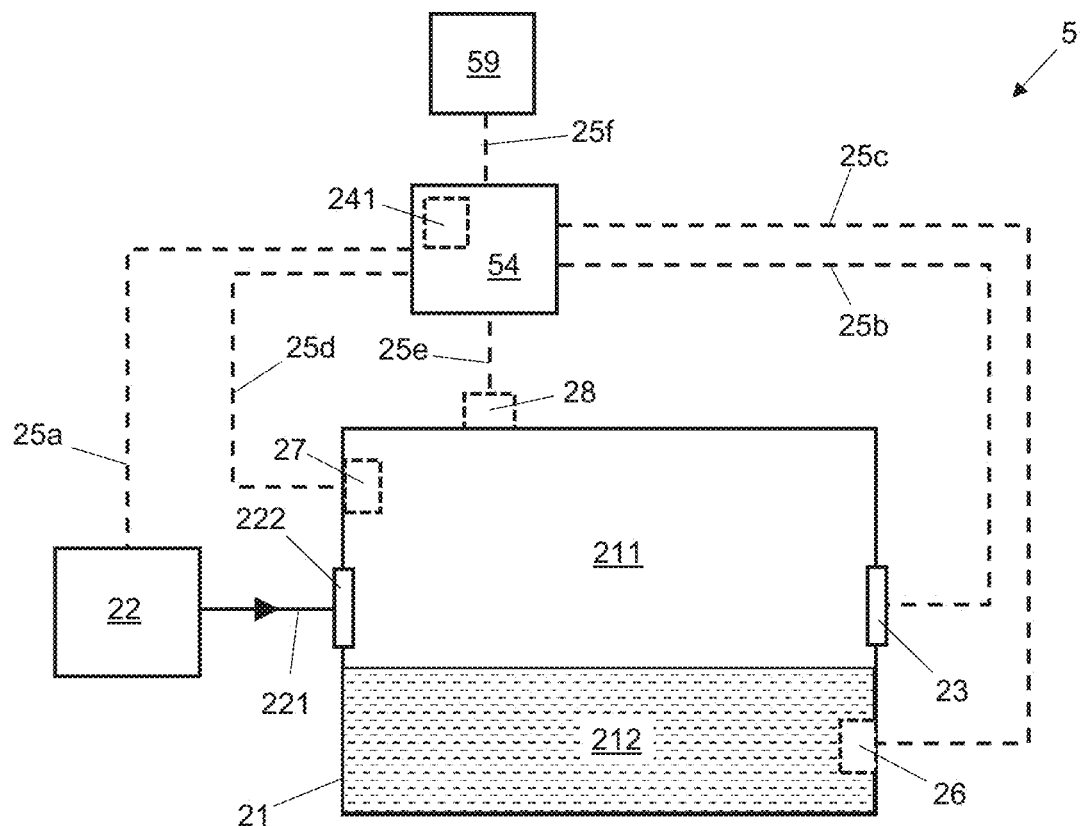
FIG. 5 is a schematic representation of a different example fuel storage system according to the invention.

FIG. 5 shows a different example fuel storage system 5 according to the invention. The fuel storage system 5 is configured to be able to regulate the temperature of the fuel in the fuel tank as well as the pressure inside the fuel tank. It is advantageous to be able to controllably alter the temperature of fuel stored by fuel storage systems according to the invention, and in particular to be able to decrease the temperature of such stored fuel, because this may enable a desired flammability level to be achieved without increasing the pressure in the fuel tank to above the external environment pressure in situations where such a pressure increase would otherwise be required. It can be seen from FIG. 1 that decreasing the temperature of fuel (whilst maintaining the pressure the same) reduces the flammability of that fuel. By using temperature reduction in combination with pressure control as described above, a desired flammability level (i.e. non-flammable) can generally be achieved with only a very small temperature decrease, which should be much easier to generate than the significant temperature reduction that would be required if pressure control were not also being used.

The fuel storage system 5 is substantially the same as the example fuel storage system 2 of FIG. 2, except for the differences explicitly described below. Features of the fuel storage system 5 which are the same as the equivalent features of the fuel storage system 2 have been indicated using the same reference numbers and will not be further described.

The fuel storage system 5 additionally comprises a controllable temperature regulation mechanism 59. The temperature regulation mechanism 59 may be any mechanism which is controllably operable to alter the temperature of the fuel 212 in the tank 21. In particular, the temperature regulation mechanism 59 is operable to decrease the temperature of the fuel 212, in order to decrease its flammability. In some examples the temperature regulation mechanism 59 is not operable to increase the temperature of the fuel 212. Although in FIG. 5 the temperature regulation mechanism 59 is shown as being external to and separated from the fuel tank 21, in some examples at least part of the temperature regulation mechanism 59 may be disposed in or on the fuel tank 21.

For most applications, it is anticipated that the desired temperature change will be small, as most of a desired flammability reduction will be achieved using the pressure regulation techniques described above. For an aircraft ACT, for example, it may be necessary to decrease the temperature of the fuel 212 by only a few degrees C. in order to avoid needing to increase the tank pressure above the pressure of the external environment. As such, temperature regulation mechanisms which exist in the environment of the fuel tank for other purposes, such as aircraft air conditioning systems, may be able to be used as the temperature regulation mechanism 59 of the fuel storage system 5.

In some examples the temperature regulation mechanism may comprise a mechanism for altering the temperature of the external environment of the fuel tank 21. For example, if the fuel tank 21 is located in an enclosed space, such as an aircraft cabin or cargo bay, the temperature regulation mechanism may comprise an air conditioning system configured to alter the temperature of the enclosed space. In such examples it may be advantageous for the walls of the fuel tank 21 to be constructed in a manner which facilitates heat transfer between the fuel 212 and the external environment of the fuel tank 21.

In some examples the temperature regulation mechanism 49 may comprise a mechanism for transferring into the tank 21 fuel which is at a different temperature to the fuel 212. A mechanism of this type can decrease the temperature of the fuel 212 within the tank 21 by transferring in fuel from a tank that is located in a colder environment than the tank 21. For example, if the tank 21 is located in a cabin or cargo bay of an aircraft (a relatively warm environment), the temperature regulation mechanism may be configured to transfer in fuel from a fuel tank located in a wing of the aircraft (a relatively cold environment). Temperature regulation mechanisms 49 of this type may comprise, for example, one or more valves, pipes, pumps, or the like.

In some examples the temperature regulation mechanism 59 may comprise a heat exchanger disposed within the fuel tank 21, at a location where it will be immersed in the fuel 212 in most or all operational states of the fuel storage system 4. Such a heat exchanger may be selectively activatable to enable the controlled removal of heat from the fuel 212. The heat exchanger may use any suitable heat exchanging technology.

The temperature regulation mechanism 59 is in communication with the controller 24 via a communications link 25f, which has substantially the same features as the communications links 25a-e described above. The controller 44 is configured to send control signals to the temperature regulation mechanism 59, via the communications link 25f, to cause the temperature regulation mechanism to operate to alter the temperature of the fuel 212 in the tank 21. The control signals will depend on the type of the temperature regulation mechanism 59 and may take any form suitable for achieving the desired temperature alteration.

The controller 54 of the fuel storage system 5 comprises all of the same functionality as the controller 24 described above, as well as additional functionality for regulating the temperature of the fuel 212 in the tank 21. In this example, as part of controlling the pressure source 22 (and the valve 23, if present) to achieve the target pressure inside the fuel tank (block 309 of the process 300), the controller 54 is configured to receive a value for the current pressure of the external environment of the fuel tank 21 (either by receiving a measured value from the environment pressure sensor 28, if present, or by generating a predicted value) and to compare the current pressure of the external environment to the target pressure in the manner described above in relation to FIG. 2. The result of this comparing may trigger the controller 54 to alter the temperature of the fuel 212 in the tank 21.

Figure 6:
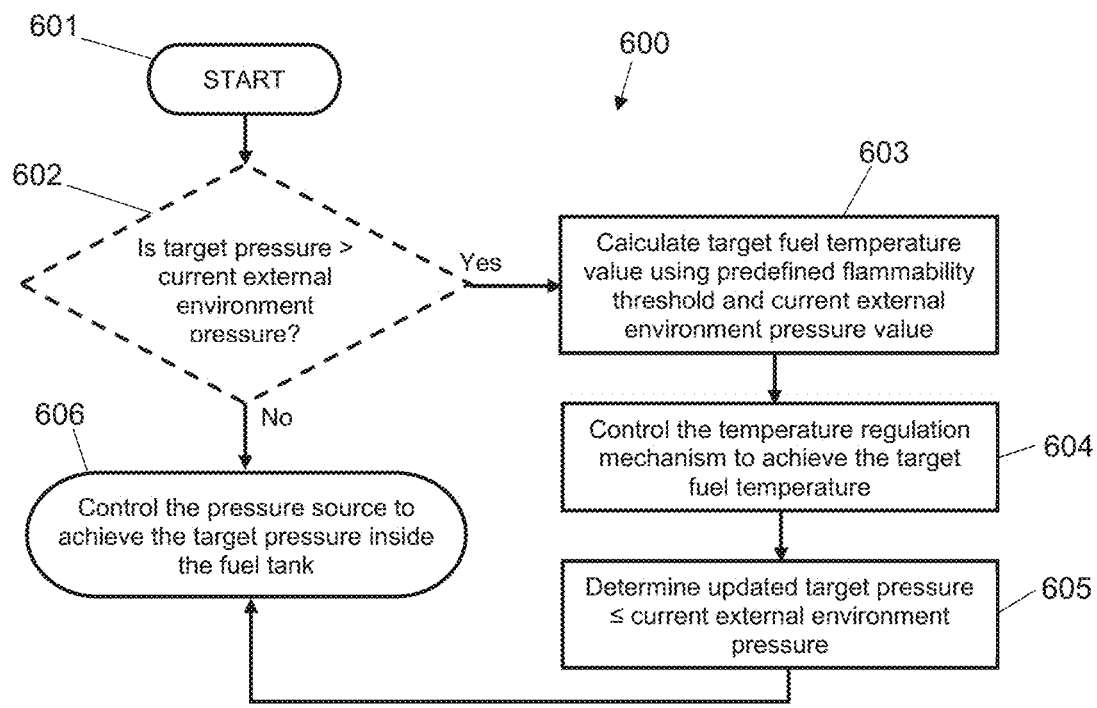
FIG. 6 is a flow chart illustrating an example process which may be performed by the fuel storage system of FIG. 4.

In particular, the controller 54 is configured to perform the process 600 shown in FIG. 6 as part of regulating the pressure within the tank 21. Performance of the process 600 may be triggered, for example, by completion of either block 306 of the process 300 or block 406 of the process 400 (if no minimum allowable pressure or maximum allowable pressure is defined) or block 308 of the process 300 (if a minimum allowable pressure is defined) or block 408 of the process 400 (if a maximum allowable pressure is defined). That is, the controller 54 may be configured to perform the process 600 as soon as it has determined an allowable value for the target pressure. The triggering of the process 600 is represented by block 601. Following such triggering, the process 600 moves to block 602.

In some examples the controller 54 is configured to check whether an acceptable rate of change of the fuel temperature is currently achievable by the fuel temperature regulation mechanism 59 before initiating the process 600. In such examples the controller 54 may be pre-programmed with a minimum threshold for fuel temperature rate of change, or with a corresponding threshold for a parameter which affects the rate of fuel temperature change. In some examples such a threshold may comprise a maximum volume of fuel in the fuel tank 21, since the rate of change of the fuel temperature decreases with increasing fuel volume. The controller 54 may perform the check using one or more current measured values of variable parameters affecting fuel temperature rate of change which are available to the controller 54. Such parameters may include, for example the volume of fuel in the tank 21, the current fuel temperature, the current temperature of the external environment of the fuel tank, and the like. If the controller 54 determines that the rate of change of the fuel temperature is unacceptably low, then the controller 54 will not perform the process 600. In such situations the controller 54 may be configured to reduce the flammability of the fuel tank 21 using a different mechanism, such as by increasing the ullage pressure using the techniques described above.

In block 602, the controller 54 determines whether the target pressure (that is, the target pressure value output by block 305 or block 405 if either no minimum or maximum allowable pressure is defined, or if the target pressure is greater than or equal to a minimum allowable pressure or is less than or equal to a maximum allowable pressure, or the target pressure value output by block 308 or block 408 in all other scenarios) is greater than the current external environment pressure. The comparing is based on a current external environment pressure value (either measured or predicted) which has been received by the controller 54 in the manner described above.

Responsive to a negative determination in block 602 (that is, a determination that the target pressure is lower than or equal to the current external environment pressure) the process 600 moves directly to block 606. In block 606, the pressure source 22 (and/or the valve 23 if present) are operated by the controller 54 so as to achieve the target pressure inside the fuel tank, in the manner described above in relation to FIG. 2. In this case, the target pressure is the target pressure value output by block 305 or block 405 if either no minimum or maximum allowable pressure is defined, or if the target pressure is greater than or equal to a minimum allowable pressure or is less than a maximum allowable pressure, or the target pressure value output by block 308 or block 408 in all other scenarios. Block 606 may be performed in the same manner as block 309 of the processes 300 and 400.

Responsive to a positive determination in block 602 (that is, a determination that the target pressure is higher than the current external environment pressure), the process moves to block 603. In block 603 a target fuel temperature value is calculated by the controller 54. The controller is configured to calculate the target fuel temperature value using the current external environment pressure and the predefined flammability threshold. In examples in which the controller 54 is pre-programmed with multiple predefined flammability thresholds, the predefined flammability threshold used by the controller 54 to calculate the target fuel temperature is the same predefined flammability threshold that was used to calculate the target pressure. The target fuel temperature may be less than or equal to the flash point of the fuel 212 at the current external environment pressure. The target fuel temperature may be considered to be a maximum fuel temperature, since it represents the highest fuel temperature at which the fuel tank is not flammable when the ullage pressure is equal to the current external environment pressure (or is a predetermined amount lower than the current external environment pressure).

In block 604, the controller 54 controls the temperature regulation mechanism 49 so as to achieve the target fuel temperature. Achieving the target fuel temperature may mean that the temperature of the fuel 212 is substantially equal to the target fuel temperature. Achieving the target fuel temperature may mean that the fuel temperature is less than or equal to the target fuel temperature. Performing block 605 comprises the controller 54 sending one or more control signals to the temperature regulation mechanism configured to cause the temperature regulation mechanism 59 to alter the temperature of the fuel 212 in the tank 21 to be less than or equal to, or substantially equal to, the target fuel temperature.

There may be a significant delay associated with achieving the target fuel temperature. In some examples the controller 54 may be configured to calculate a delay associated with achieving a given target fuel temperature. In such examples the controller 54 may be pre-programmed with fuel temperature change information relating to how quickly the temperature of the fuel 212 is expected to change in response to activation of the fuel temperature regulation mechanism 59. Such fuel temperature change information may be based on factors such as the chemical properties of the fuel 212; the amount of fuel in the fuel tank 21; the configuration of the fuel tank 21; the nature of the temperature regulation mechanism 59; and the like. The time delay for a given desired fuel temperature change can be calculated using the fuel temperature change information.

If the controller 54 determines that a significant delay is associated with achieving the target fuel temperature, the controller 54 may operate the pressure source 22 to increase the pressure in the fuel tank 21 to the target pressure (that is, the target pressure value output by block 305 or block 405 if either no minimum or maximum allowable pressure is defined, or if the target pressure is greater than or equal to a minimum allowable pressure or is less than or equal to a maximum allowable pressure, or the target pressure value output by block 308 or block 408 in all other scenarios) during the time period in which the fuel temperature change is taking place (that is, the delay period). This ensures that the flammability of the fuel tank 21 will not increase above an acceptable level during the process of reducing the fuel temperature. As discussed above, it may be advantageous for the controller 54 to be configured to take account of factors affecting how quickly the fuel temperature regulation mechanism 59 is able to change the temperature of the fuel 212, such as current fuel volume, and to determine not to instigate the process 600 if the achievable rate of change of the fuel temperature by the fuel temperature regulation mechanism 59 is too slow (e.g. is below a predefined threshold).

Upon completion of block 604 (that is, when the temperature of the fuel 212 has become equal to the target fuel temperature), in block 605 the controller 54 determines an updated target pressure, which is less than or equal to the current external environment pressure. In some examples, the controller 54 sets the updated target pressure to be lower than the current external environment pressure, by a predetermined amount, in order to avoid leakage of fuel vapour from the fuel tank 21 to the external environment.

The process 600 then moves to block 606, in which the controller 54 controls the pressure source (and/or the valve 23, if present) to achieve the target pressure inside the fuel tank (which in this case is the updated target pressure output by block 605), in the manner described above. In some examples in which the controller 54 is configured to perform the process 600 as part of performing block 309 of the process 300 or the process 400, the completion of block 606 (and thus of the process 600) may result in the completion of block 309. In other such examples, the controller 54 may perform further operations after the completion of the process 600, in order to complete block 309.

Figure 7:
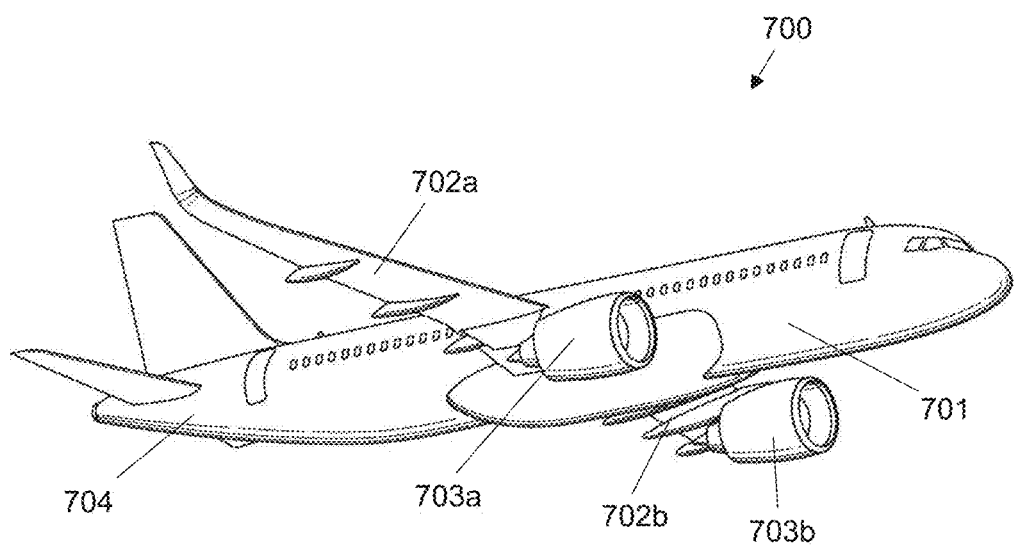
FIG. 7 is a perspective view of an example aircraft according to the invention.

FIG. 7 shows an example aircraft 700 comprising a fuel storage system according to the invention. The aircraft 700 comprises a fuselage 701, a pair of wings 702a and 702b, a pair of engines 703a and 703b, and an empennage 704. The aircraft 700 further comprises a computing system (not shown) which may, for example, comprise one or more processors and one or more computer readable storage media. The aircraft 700 may also comprise instruments or sensors for measuring characteristics or parameters related to the aircraft, and instruments or sensors for measuring environmental characteristics, which may be distributed at various different locations on the aircraft 700. The aircraft 700 may also comprise indicating devices for providing various indications relating to the aircraft. The indicating devices may include screens which display text and/or graphics, dials, light indicators, sound indicators which emit sound to provide indications, and the like.

The aircraft 700 comprises a plurality of fuel tanks (not visible) and a fuel distribution system for transporting fuel from the tanks to the engines 703a, 703b. For example, the fuel tanks may comprise sealed compartments at least partly formed by the structure of the wings 702a, 702b, the empennage 704, and/or the fuselage 701, and/or any other part of the aircraft 700. Alternatively or additionally, the aircraft 700 may comprise one or more fuel tanks located within pressurised regions of the aircraft, such as the cabin and cargo bay. In this particular example the aircraft 700 comprises an additional cargo tank (ACT) located in the cargo bay. The aircraft 700 may further comprise a fuel properties measurement unit (not visible) configured to measure characteristics of uplifted fuel during refuelling operations, including the temperature of the uplifted fuel.

As mentioned above, the aircraft 700 comprises a fuel storage system according to the invention. The ACT is comprised in the fuel storage system. The fuel storage system may have the same features as either of the example fuel storage systems 2, 4 described above. The controller of the fuel storage system is in communication with the fuel properties measurement unit (if present) such that the controller can receive measurement data (such as fuel temperature) from the fuel properties measurement unit. The controller of the fuel storage system may, alternatively or additionally, be in communication with other computing systems of the aircraft 700, and/or with any of the instruments, sensors and indicating devices of the aircraft 700.

Operation of the specific example fuel storage system of the aircraft 700 will now be described. It should be appreciated that this represents a particular example of how a fuel storage system according to the invention might operate, if applied to an aircraft, and that certain features described below will not be applicable to other examples of the invention.

During the cruise phase of flight, the cargo bay of the aircraft 700 in which the ACT is located is pressurised according to a predefined pressure profile. This pressure is the external environment pressure of the ACT, and is known to the controller of the fuel storage system either by the controller receiving a measured value of this pressure, or by the controller being pre-programmed with information about how the aircraft 700 is configured to pressurise the cargo bay at any given point in a flight.

At a selected time during the cruise phase, the pressure in the cargo bay (the external environment pressure) is 800 mb. At the selected time the aircraft 700 is flying at 36,000 ft. The controller of the fuel storage system knows the current altitude of the aircraft 700, either by receiving a measured altitude value or by being pre-programmed with information about the flight plan of the aircraft 700. The controller also knows the type of the fuel in the ACT at the selected time, either because this information was manually input to the controller when the aircraft 700 was refuelled or because the controller received fuel type information directly from the fuel properties measurement unit when the aircraft 700 was refuelled. The controller is pre-programmed with a predefined flammability threshold applicable to that type of fuel, and uses that predefined flammability threshold for its operations until it receives updated fuel type information. In this particular example, the type of fuel in the ACT at the selected type corresponds to the flammability information shown in FIG. 1.

The controller is also pre-programmed with a minimum allowable pressure (for the pressure inside the ACT), the purpose of which is to ensure that fuel transfer driven by tank pressure is possible. In this example the minimum allowable pressure is 450 mb. The controller is therefore configured to maintain the pressure inside the ACT at at least 450 mb throughout any flight of the aircraft 700.

If the temperature of the fuel in the ACT is below 30° C. at take-off, the ACT will not be flammable at any point during the flight if the tank pressure is maintained at 450 mb (as the fuel temperature will decrease over the course of the flight). In this scenario, the controller (operating in the manner described above in relation to the example controllers 24, 44) will not need to increase the tank pressure above the minimum allowable pressure. This pressure is well below the external environment pressure of 800 mb, meaning that the risk of fuel vapour leaking into the cargo bay is very low.

If temperature of the fuel in the ACT is above 30° C. at take-off, the controller operates to regulate the pressure in the ACT according to the fuel temperature, in the manner described above in relation to the example controller 24. As long as the fuel temperature at take-off is less than or equal to 40° C., the pressure inside the ACT does not need to increase above the external environment pressure of 800 mb. However; if at take-off the fuel temperature is above 40° C., it is not possible for the controller to maintain an acceptably low level of flammability of the ACT without either increasing the tank pressure to above the external environment pressure, or reducing the temperature of the fuel in the ACT.

If the fuel storage system of the aircraft 700 comprises a temperature regulation mechanism, the controller will operate the temperature regulation mechanism in the manner described above in relation to the example controller 44, to avoid increasing the tank pressure to above the external environment pressure. This may involve, for example, the controller causing the cargo bay air conditioning system to reduce the temperature in the cargo bay. If the fuel storage system does not comprise a temperature regulation mechanism, the controller will increase the tank pressure to above the cabin pressure in order to keep the tank flammability level sufficiently low. The controller will only maintain the tank pressure above the external environment pressure until the temperature of the fuel drops enough for the tank pressure to be reduced to less than or equal to the external environment pressure.

This example illustrates that, for an aircraft equipped with a fuel storage system according to the invention, the need to increase ACT pressure above the pressure of the external environment would be a very rare event for some airlines/aircraft. This will be true for aircraft operating on routes where the airport ambient temperature is always below 40° C. and/or where the airport stores fuel underground (which typically maintains the temperature of the fuel below 30° C.).

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:
1. A fuel storage system comprising:
a fuel tank configured to store a liquid fuel;
a controllable pressure source for altering the pressure in an ullage space of the fuel tank;
a controller configured to:
determine a target pressure for the ullage space at a given time based on information relating to a temperature of fuel inside a different fuel tank at the given time;
calculate a value for the temperature of fuel inside the fuel tank at the given time based on the current value of the temperature inside the different fuel tank using a predefined relationship between temperature of fuel in the different fuel tank and temperature of fuel in the fuel tank; and
control the pressure source such as to cause the pressure in the ullage space to be substantially equal to the target pressure.

2. A fuel storage system according to claim 1, further comprising a controllable pressure release valve, wherein the controller is configured to control the pressure source and/or the pressure release valve such as to cause the pressure in the ullage space to be substantially equal to the target pressure.

3. A fuel storage system according to claim 1, wherein the target pressure is a pressure at which the flammability of the fuel tank is less than or equal to a predefined flammability threshold, wherein the predefined flammability threshold depends on the temperature of the fuel in the fuel tank, the pressure in the ullage space, and the chemical properties of the fuel in the fuel tank.

4. A fuel storage system according to claim 1, wherein the controllable pressure source comprises a source of air which is at a pressure greater than the pressure in the ullage space for at least some time periods during normal operation of the fuel storage system.

5. A fuel storage system according to claim 1, wherein the controllable pressure source comprises a compressor.

6. A fuel storage system according to claim 1, wherein the controllable pressure source comprises a controllable valve disposed between the ullage space and a high-pressure environment in which the pressure is higher than the pressure in the ullage space for at least some time periods during normal operation of the fuel storage system, wherein the controllable valve is selectively openable to connect the ullage space to the high-pressure environment.

7. A fuel storage system according to claim 6, wherein the high-pressure environment is a pressurised region of an aircraft.

8. A fuel storage system according to claim 1, wherein the information relating to a temperature of fuel inside the fuel tank at the given time comprises a current measured value of a parameter indicative of the temperature of fuel inside the fuel tank, wherein the parameter is the temperature of the fuel inside the tank, and wherein the fuel storage system further comprises a temperature sensor configured to measure the temperature of fuel inside the fuel tank in communication with the controller.

9. A fuel storage system according to claim 1, wherein the information relating to a temperature of fuel inside the fuel tank at the given time comprises a current measured value of a parameter indicative of the temperature of fuel inside the fuel tank, wherein the parameter is the temperature of the external environment of the fuel tank and wherein the controller is configured to calculate a value for the temperature of fuel inside the fuel tank at the given time based on a current value of the temperature of the external environment of the fuel tank using a predefined relationship between temperature of the external environment and temperature of fuel in the fuel tank.

10. A fuel storage system according to claim 1, wherein the information relating to a temperature of fuel inside the fuel tank at the given time comprises a historical value of a parameter indicative of the temperature of fuel inside the fuel tank, and wherein the controller is configured to generate a predicted value for the temperature of the fuel inside the fuel tank at the given time based on the historical value using predefined fuel temperature evolution information.

11. A fuel storage system according to claim 1, wherein the controller is pre-programmed with a minimum allowable pressure for the fuel tank, and is configured to control the pressure source such that the pressure in the ullage space is maintained greater than or equal to the minimum allowable pressure during normal operation of the fuel storage system; and/or is pre-programmed with a maximum allowable pressure for the fuel tank, and is configured to control the pressure source such that the pressure in the ullage space is maintained less than or equal to the maximum allowable pressure during normal operation of the fuel storage system.

12. A fuel storage system according to claim 1, further comprising a controllable temperature regulation mechanism for altering the temperature of fuel stored in the fuel tank, wherein the controller is additionally configured to:

determine a target fuel temperature at the given time based on information relating to the pressure of the external environment of the fuel tank at the given time; and control the temperature regulation mechanism such as to cause the temperature of fuel inside the tank to be substantially equal to the target fuel temperature.

13. A fuel storage system according to claim 12, wherein the controller is configured to maintain the pressure in the ullage space less than or equal to the pressure of the external environment of the fuel tank during normal operation of the fuel storage system, and is configured to determine the target pressure additionally based on the pressure of the external environment at the given time.

14. A fuel storage system according to claim 12, wherein the controller is configured to:

determine whether the flammability of the fuel tank will be greater than the predefined flammability threshold at the given time if the pressure in the ullage space is equal to the pressure of the external environment at the given time, or is less than the pressure of the external environment at the given time by a predefined amount; and if it is determined that the flammability of the fuel tank will be greater than the predefined flammability threshold, determine a value for the target fuel temperature such that the flammability of the tank will be below the predefined flammability threshold when the fuel is at the target fuel temperature and the pressure in the ullage space is equal to the pressure of the external environment at the given time, or is less than the pressure of the external environment at the given time by the predefined amount.

15. A fuel storage system according to claim 12, wherein the temperature regulation mechanism is configured to alter the temperature of the external environment of the fuel tank.

16. A fuel storage system according to claim 12, wherein the temperature regulation mechanism comprises a heat exchanger disposed on or in the fuel tank.

17. A fuel storage system according to claim 12, wherein the temperature regulation mechanism comprises a mechanism for transferring fuel into the fuel tank fuel, wherein the transferred fuel is at a different temperature to the fuel in the fuel tank.

18. A fuel storage system according to claim 1, wherein the fuel tank is an additional cargo tank for an aircraft.

19. An aircraft comprising a fuel storage system according to claim 1.

20. An aircraft according to claim 19, wherein the fuel tank is located in a pressurised zone of the aircraft.

21. A method of controlling the flammability of a fuel tank containing fuel, the method comprising:

providing a controller, wherein the controller is configured to calculate a value for a temperature of fuel inside the fuel tank at the given time based on the current value of the temperature inside a different fuel tank using a predefined relationship between temperature of fuel in the different fuel tank and temperature of fuel in the fuel tank;

receiving a current fuel temperature value for the fuel in the fuel tank;

determining a minimum ullage pressure using predefined flammability information for the fuel tank, wherein the determined minimum ullage pressure is the lowest ullage pressure at which the fuel tank is not flammable when fuel contained in the fuel tank is at the current fuel temperature;

controlling the ullage pressure to be greater than or equal to the minimum ullage pressure.

22. A method according to claim 21, further comprising:

receiving a current external pressure value for the pressure of the external environment of the fuel tank;

comparing the determined minimum ullage pressure to the received current external pressure value;

if the determined minimum ullage pressure is greater than the received current external pressure value, determining a maximum fuel temperature using the predefined flammability information, wherein the maximum fuel temperature is the highest fuel temperature at which the fuel tank is not flammable when the ullage pressure is equal to the received current external pressure value;

controlling the temperature of the fuel in the fuel tank to be less than or equal to the maximum fuel temperature; and controlling the ullage pressure to be greater than or equal to the minimum ullage pressure and less than or equal to the received current external pressure value.

* * * * *